Nov. 24, 1931.   G. E. GRIMM   1,832,845
AUTOMOBILE BODY
Filed May 31, 1927   6 Sheets-Sheet 1
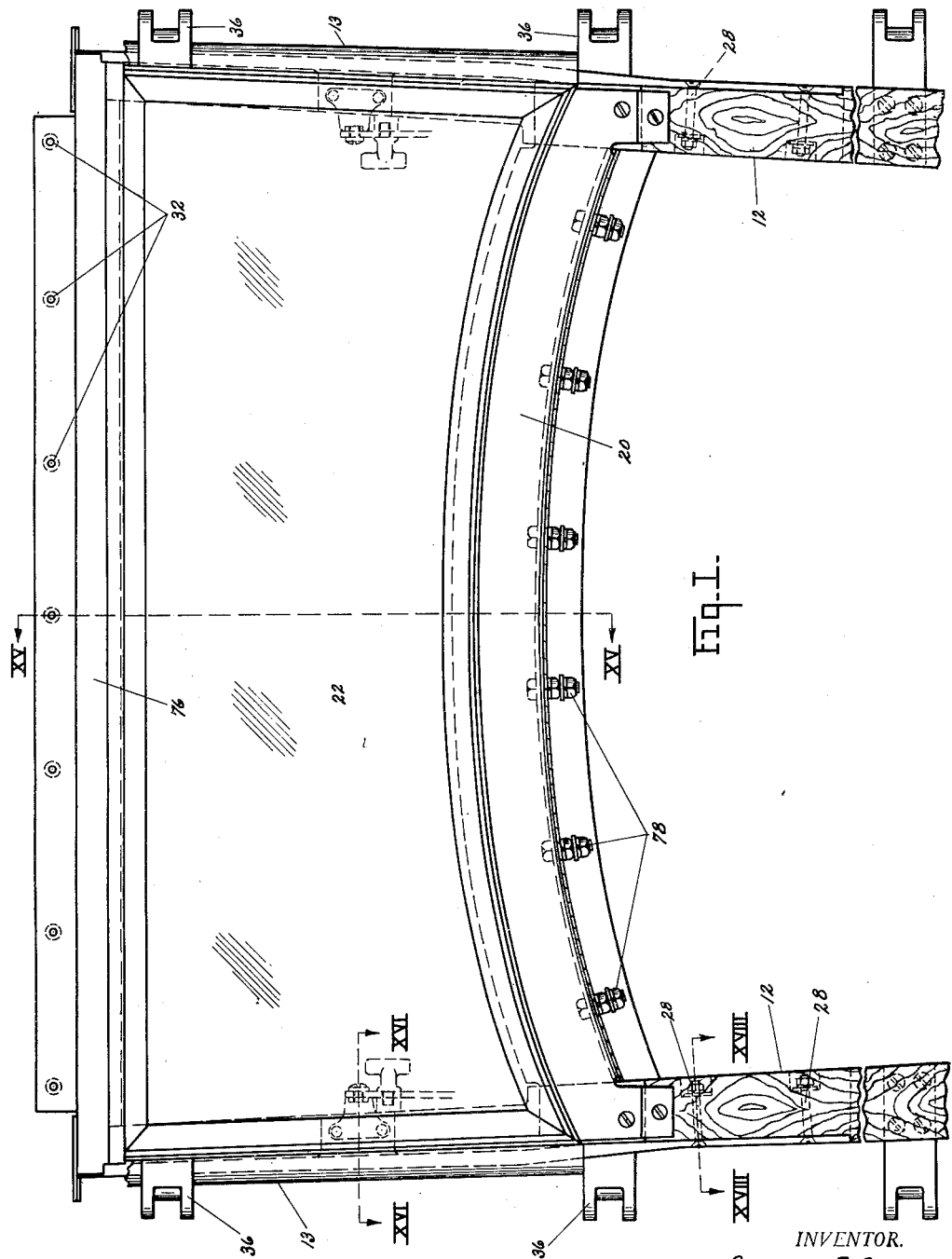
INVENTOR.
GEORGE E. GRIMM.
BY Chester H. Braselton
ATTORNEY.

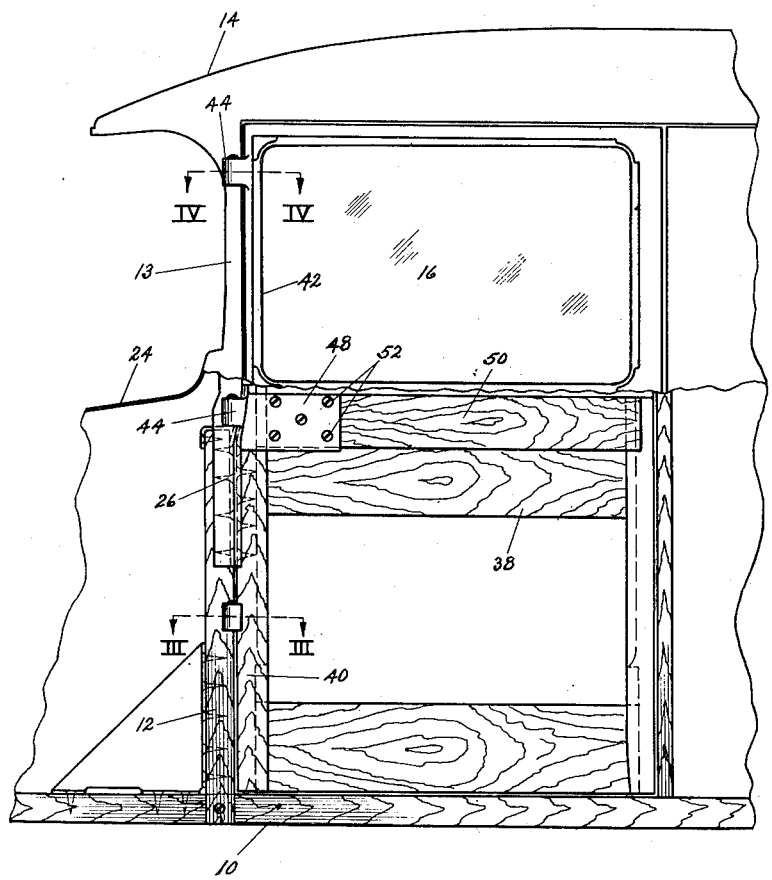
Fig. II.

Nov. 24, 1931.  G. E. GRIMM  1,832,845
AUTOMOBILE BODY
Filed May 31, 1927  6 Sheets-Sheet 3
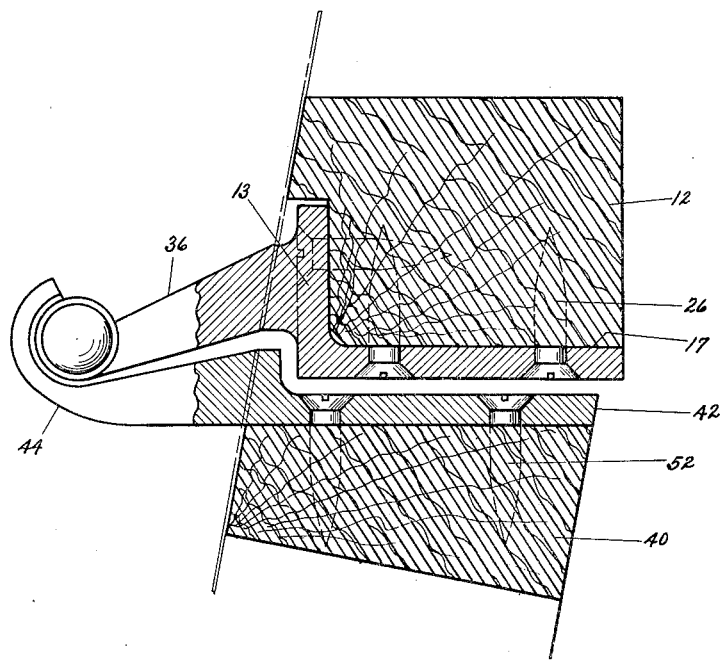
Fig. III.
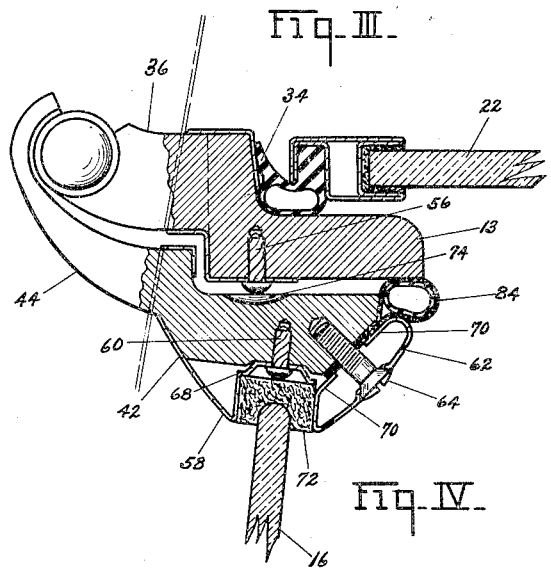
Fig. IV.
INVENTOR.
GEORGE E. GRIMM
BY Chester H. Braselton
ATTORNEY.

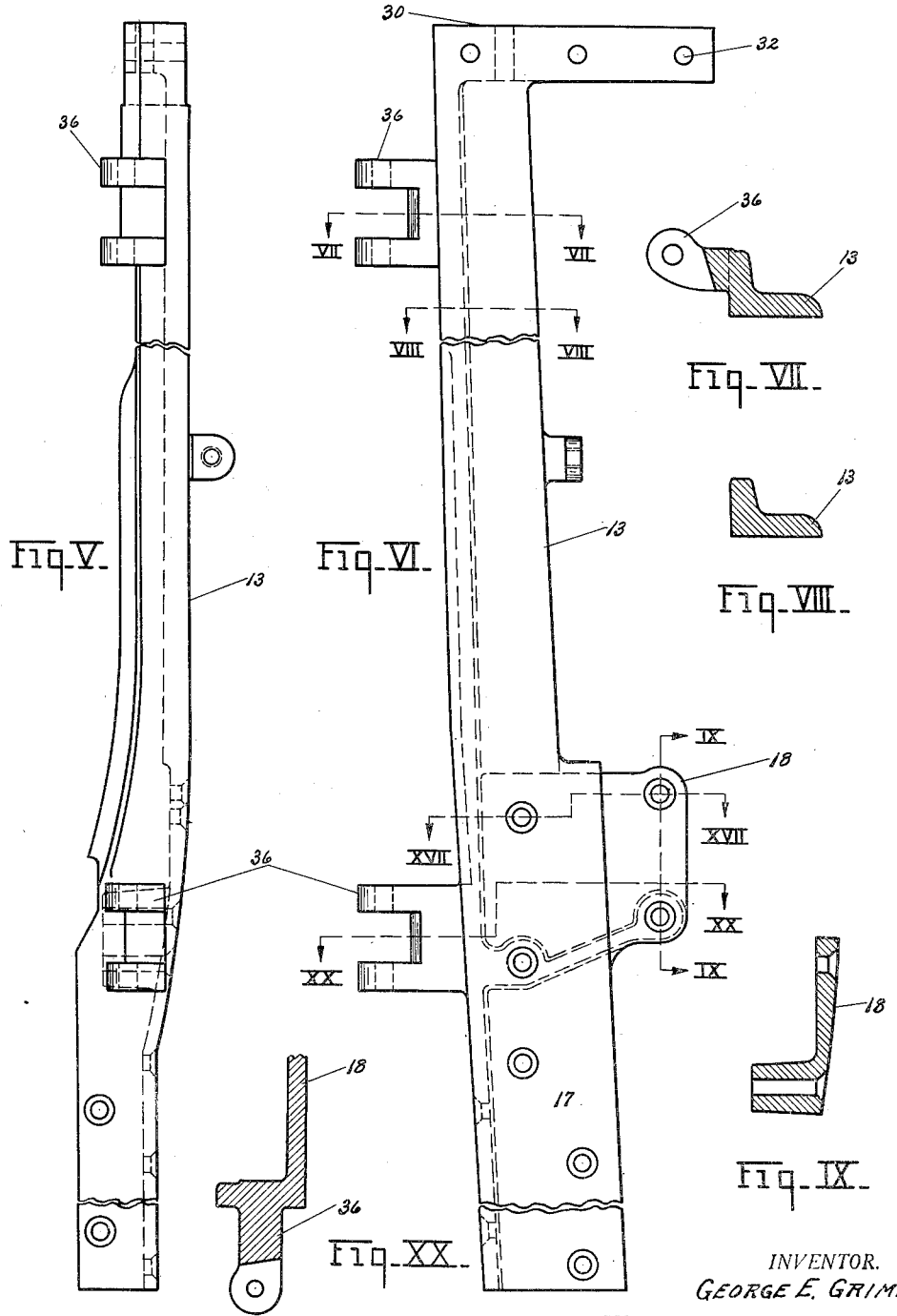

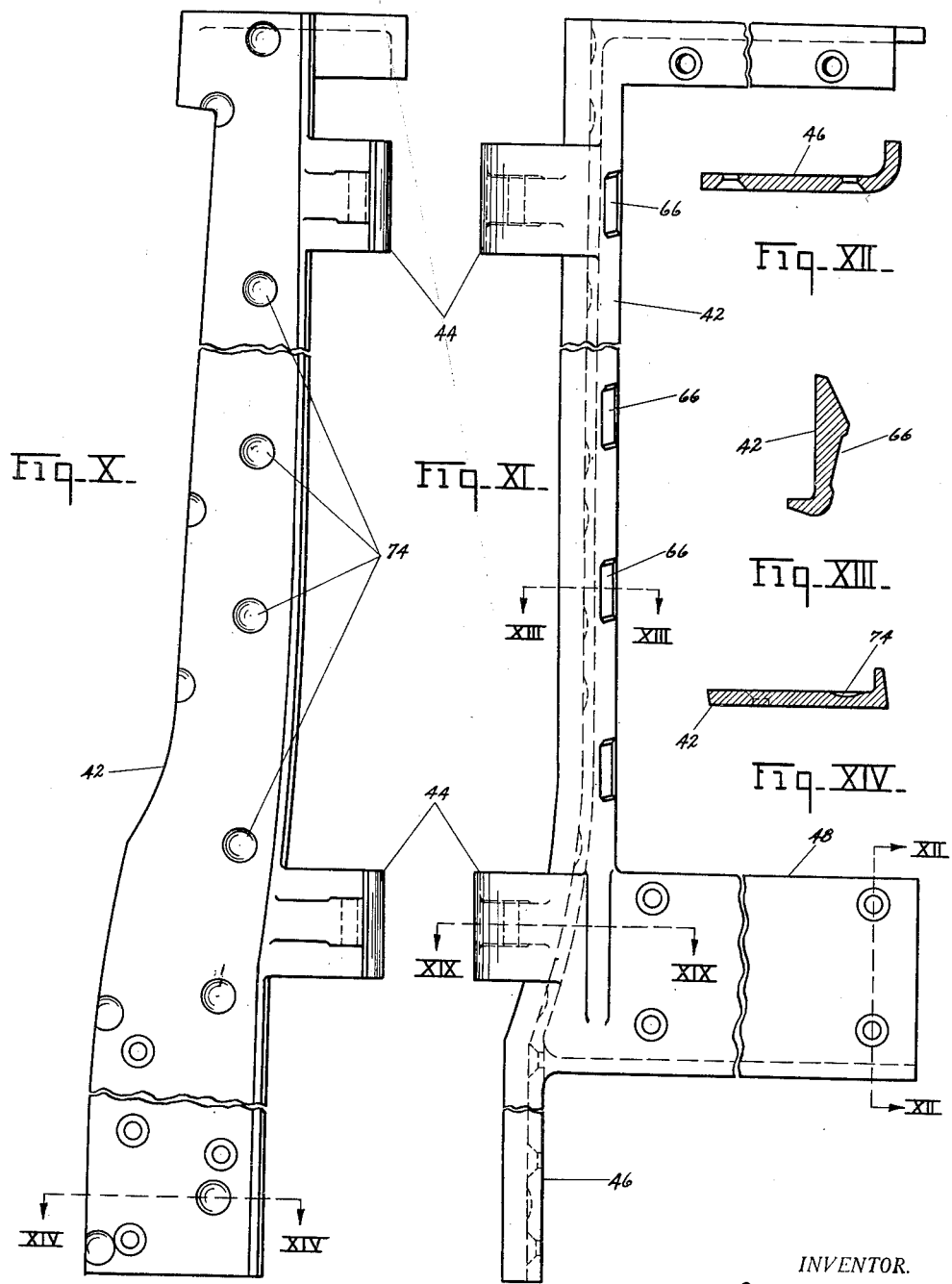

Nov. 24, 1931.          G. E. GRIMM          1,832,845
                        AUTOMOBILE BODY
                      Filed May 31, 1927         6 Sheets-Sheet 6
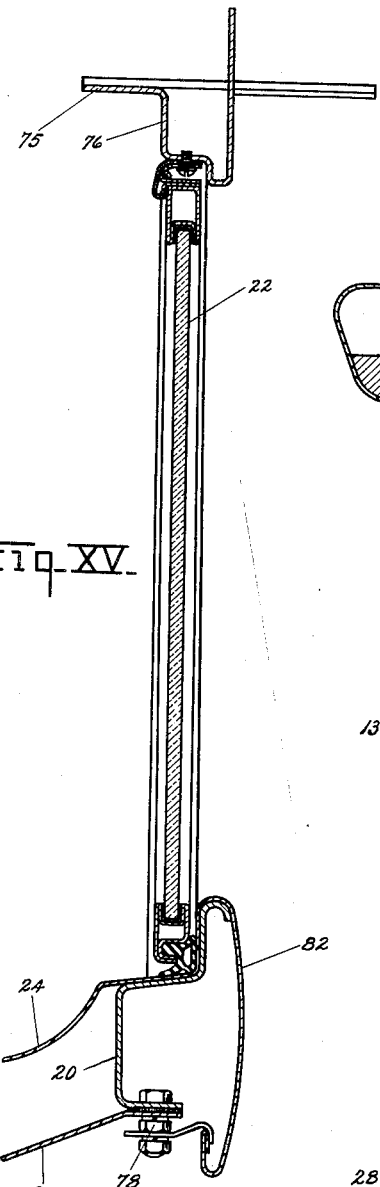
Fig. XV.
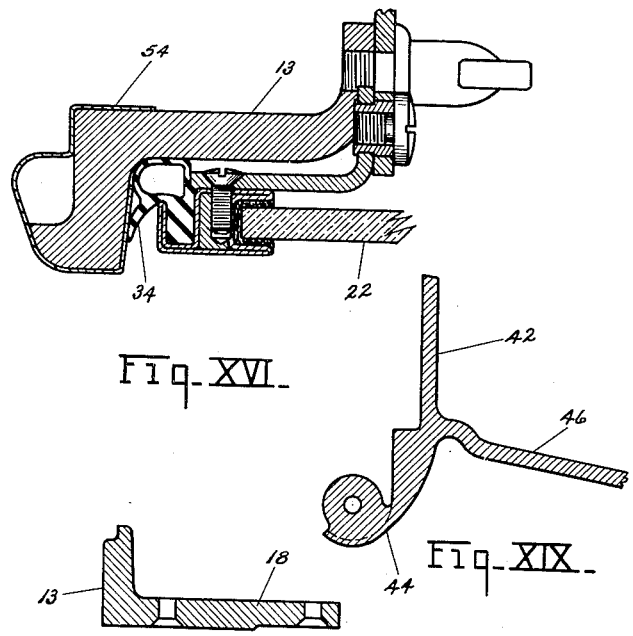
Fig. XVI.
Fig. XIX.
Fig. XVII.
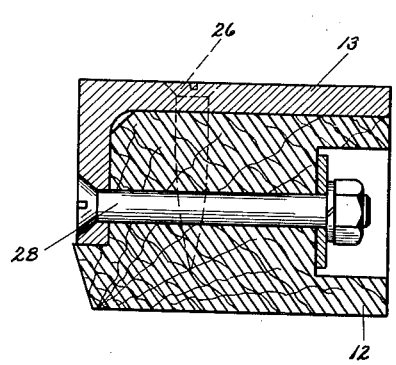
Fig. XVIII.
INVENTOR.
GEORGE E. GRIMM
BY Chester H. Braselton
    ATTORNEY.

Patented Nov. 24, 1931

1,832,845

UNITED STATES PATENT OFFICE

GEORGE E. GRIMM, OF TOLEDO, OHIO, ASSIGNOR TO THE WILLYS-OVERLAND COMPANY, OF TOLEDO, OHIO, A CORPORATION OF OHIO

AUTOMOBILE BODY

Application filed May 31, 1927. Serial No. 195,159.

This invention relates to automobile bodies and more particularly to the front corner posts of closed type automobile bodies.

One of the objects of the invention is to provide an automobile body with front corner posts of narrow width.

Another object of the invention is to provide a metal corner post for an automobile body that may be easily secured to both the top and frame portions of the body.

Another object of the invention is to provide a metal corner post for an automobile body having integral hinge portions.

Another object of the invention is to provide a metal corner post for an automobile body that is of narrow width.

Another object of the invention is to provide a cast metal corner post for an automobile body that may be easily trimmed with separately attached finishing strips.

A further object of the invention is to provide a vehicle body with front corner posts that do not materially obstruct the vision of the vehicle occupants.

Closed automobile body frame structures are ordinarily formed of wood or sheet metal, the front corner posts being formed of the same material that is used in the frame portion. The front corner posts must have sufficient strength to support both the top and windshield portions of the body, and in cases wherein a door abuts the post, sufficient material to support the door hinges or locks must be provided. Both the wood and sheet metal posts are in some respects undesirable. The wood post is necessarily so thick that it materially obscures the vision of the vehicle operator, and is frequently the cause of accidents. The sheet metal post is somewhat better in this respect, as it may be constructed of oblong section, in which the short side is placed toward the front of the vehicle with a resulting increase in forward vision. This increase in forward vision is reduced in actual value, however, by the fact that the side of the post must necessarily be of considerable width for providing the necessary strength, and the gain in forward vision is offset by the loss in lateral vision. All metal posts are also open to the objection that they transmit vibration from the frame of the vehicle to the body portion, and are not easily changed in length to conform with other parts of the body that are somewhat variable in dimension due to inaccuracies of manufacture.

The objections to previous posts are overcome by the present invention, which preferably consists of a composite wood and metal post having the lower portion formed of wood and the upper portion formed of cast metal. The lower wooden portion of the composite post absorbs the vibration originating in the frame, and lends itself to easy corrections necessitated by variations in the body dimensions. The upper cast metal portion provides the necessary strength without objectionable reduction in vision, as the material may be cast of a section thicker than that used in a sheet metal post, and a greater amount of metal may be included within a circle of a given radius. The cast metal portion of the post may also have the door hinges cast integral therewith, which is both more economical and more compact in design. A better understanding of the invention may be had by reference to a preferred embodiment that I have illustrated in the accompanying drawings in which:

Figure I is a front elevation partly in section, of the front portion of the vehicle body embodying the invention.

Fig. II is a side elevation showing the body and door pillars in assembled relation.

Fig. III is a sectional view taken on line III—III of Fig. II.

Fig. IV is a sectional view taken on a line IV—IV of Fig. 11.

Fig. V is a side elevational view of the left front body pillar.

Fig. VI is a front elevational view of the left front body pillar.

Fig. VII is a sectional view taken on line VII—VII of Fig. VI.

Fig. VIII is a sectional view taken on line VIII—VIII of Fig. VI.

Fig. IX is a sectional view taken on line IX—IX of Fig. VI.

Fig. X is a front elevation of the left door pillar.

Fig. XI is a side elevation of the left door pillar.

Fig. XII is a sectional view taken on line XII—XII of Fig. XI.

Fig. XIII is a sectional view taken on line XIII—XIII of Fig. XI.

Fig. XIV is a sectional view taken on line XIV—XIV of Fig. X.

Fig. XV is a sectional view taken on line XV—XV of Fig. I.

Fig. XVI is a sectional view taken on line XVI—XVI of Fig. I.

Fig. XVII is a sectional view taken on line XVII—XVII of Fig. VI.

Fig. XVIII is a sectional view taken on line XVIII—XVIII of Fig. I.

Fig. XIX is a sectional view taken on line XIX—XIX of Fig. XI.

Fig. XX is a sectional view taken on line XX—XX of Fig. VI.

Referring to the drawings in which like parts are designated by like numerals throughout the views, I have shown in Figs. I and II the front portion of a closed vehicle body having the conventional wood body sills 10 from which arise wooden pillars 12, having cast metal continuations 13 secured to the upper ends thereof and forming together with the wooden lower portions, composite body hinge pillars that extend from the sills 12 to the roof 14. The wooden portions are preferably of rectangular section of any suitable size in order to facilitate convenient attachment to the upper portions and terminate at approximately the lower edge of the window 16. The upper metallic portions 13 of the pillars are very much smaller and are preferably cast with integral flattened portions 17 for attachment to the wooden upright posts, and laterally extending portions 18 for securing them to the arch bar 20 that extends across the body to the opposite post. The arch bar 20 forms an abutment for the movable windshield 22, and a support for the cowl member 24 in addition to its pillar bracing function. The metallic portions of the pillars are secured to both the wooden post and the arch member by wood screws 26 and bolts 28, the upper portion of the cast members being provided with lateral extensions 30 for permanent attachment to the top by means of any suitable securing means extending through holes 32. The cross section of each cast body pillar portion 13 is preferably an L section having the angular portion of the L facing forward in order to allow the movable windshield 22 to fold backward into the L and permit the weather strip 34 to contact with the back and side of the pillar recess. Hinge members 36 are preferably cast integral with the pillar 13 in order to reduce the cost and also to avoid a reduction of vision caused by the ordinary means used to attach separate hinges.

The door 38 which is pivotally secured to the front body pillar, has its hinge pillar of substantially the same construction as the body hinge pillar, that is, the lower portion 40 is formed of wood, and the upper portion 42 is formed of a casting similar to the body hinge pillar. The hinge portions 44 are also cast integral with the door pillar and have lower flattened portions 46 and 48, for providing convenient attachment to the wooden door pillar 40 and door frame member 50 respectively by wood screws 52. In order to reduce the machining of the casting to a minimum, I prefer to leave the greater portion of both the body and door pillars in the unfinished condition, and to provide finishing strips, preferably formed of sheet metal, for imparting the desired shape and appearance to the posts. The body pillar requires but one finishing strip 54 which is shaped to contact with opposite sides of the L-shaped pillar 13, and is secured thereto by means of drive screws 56 which permanently secure the finishing strip that gives a pleasing finished appearance to the pillar.

The door 38 which is provided with a slidable window 16, necessarily requires two finishing strips, which consist of an outer strip 58 that is secured to the pillar by drive screws 60, in the same manner as in the case of the body pillar 13, and an inner strip 62 secured to the pillar by screws 64. The finishing strips for the door pillar 42 serve a dual purpose, one of which is to give a pleasing appearance to the pillar and the other of which is to provide a supporting guide for the slidable window 16. Because of this, the door finishing strips require to be better located than the body pillar finishing strips 54, and I have provided recesses 66 in the door pillar 42 into which are received projecting portions 68 of the outer finishing strip 58, for securely holding the strip in a predetermined relation to the slidable window 16. The inner finishing strip 62 which forms the opposite side of the window guide, is preferably removably held in position by screws 64 and is preferably formed with inturned edges 70 which afford some resilience to the strip 62, and permit the screws 64 to be tightened and cause the strip to exert a pressure upon the flexible packing 72. It may be noted in Fig. IV that the adjacent surfaces of the body and door hinge pillars are parallel and very close together, and also that the head of the drive screws 56 extend inwardly toward the door pillar. Because of this, in some cases it is necessary to provide slight clearance depressions 74 in the opposite pillar to prevent the contacting of the door pillar with the heads of the drive screws, that are used for attaching the finishing strip 54 to the body pillar 13. It is not necessary to have the finishing strips contact with the entire surface of the pillars at some points and it may be desirable to have the finishing strips of some other shape than that of the pillars, in order to give a more pleasing appearance thereto. Such deviations of the finishing strip from the general contour of the pillars are shown in Figs. IV and XVI.

In addition to the cast metal corner posts and metal arch bar, I also prefer to have the windshield header member 76 formed of metal, as by so doing a complete metal frame for the movable windshield is provided. Both the header 76 and the arch bar 20 may be formed of cast metal but I prefer to make these parts of sheet metal, as it has been found that space is not of sufficient importance to make the sheet metal construction less desirable than the cast form. Sheet metal has some advantages for these parts, in that the thin flanges 75 of the header 76 are easily secured to the roof 14, and the open channeled arch bar 20 permits the bolts 78, that secure the instrument board 80, to be concealed by the finishing panel 82. For the body corner posts, overall dimensions are of prime importance, and it is believed that the cast pillar construction shown and described, provides the necessary strength with less visual obstruction than any other form. The casting is stronger than wood, more compact than a sheet metal post of equal strength, and the necessity of machining the surface is eliminated by the thin metal finishing strips. If it is desired, both the body and door hinge pillars may be formed entirely of metal, but I prefer the composite wood and cast metal structure because of the sound deadening nature of the wood, and the ease with which the wood portions may be changed to correct inaccuracies in the other parts.

The hereindescribed method of constructing a corner post provides a structure that has many distinct advantages. It may be noticed from Fig. IV that the windshield 22, in its normal position, is housed within the angle of the body pillar so that the body pillar together with all opaque parts, such as the hinges 36 and 44, finishing strips 54, 58 and 62, and the packing strip 84, form a body corner post that presents very little visional obstruction to a vehicle operator who is positioned inside the angle formed by the windshield 22 and the door window 16. The section of the post which is formed by both the body and door hinge pillars is very compact, and the amount of material that is included in the smallest circle that will encompass the whole post is materially greater than is possible to secure with a post formed of sheet metal members. The material used in sheet metal pillars must necessarily be made of thin section and extend further in either a longitudinal or lateral direction for providing the same amount of metal. It may also be noticed that the integral hinges present less visional obstruction than the conventional hinges used with both wooden and sheet metal pillars, and which are ordinarily secured to the pillars by bolts or screws that in themselves reduce the vision from within the vehicle body.

While I have illustrated and described, somewhat in detail, one embodiment of the invention, it is to be understood that this showing and description is illustrative only, and that I do not regard the invention as limited to the details of construction illustrated and described except in so far as I have included such limitations within the terms of the following claims.

I claim:

1. A door having one pillar thereof adapted to lie adjacent a vehicle corner post, said pillar comprising a wooden lower portion and a cast metal upper portion, and sheet metal finishing strips secured to the outer surface thereof for concealing said cast metal portions.

2. A door having one pillar thereof adapted to lie adjacent a vehicle corner post, said pillar comprising a wooden lower portion and a cast metal upper portion, a door window slidable adjacent said pillar and a finishing strip covering said cast portion and forming a guide for said window.

3. A door having one pillar thereof adapted to lie adjacent a vehicle corner post, said pillar comprising a wooden lower portion and a cast metal upper portion, a door window slidable adjacent said pillar, an outer finishing strip covering a portion of said cast portion and providing a guide for said window, and a second finishing strip covering another portion of said cast portion and adapted to retain said window in engagement with the first mentioned finishing strip.

4. A door for a vehicle comprising a cast metal pillar post having a depression cast therein and hinge members for supporting the door, a complementary pillar post, cross members interconnecting the pillar posts and maintaining the same in spaced relation, a molding member disposed adjacent the pillar post adapted to interlock with the depression thereof to retain a glass in slidable relation therewith.

5. A door for a vehicle comprising a pillar post having hinges secured thereto for supporting the same, a complementary pillar post, cross members interconnecting the posts, molding members adjacent the pillars and disposed to guide a glass in slidable relation therewith, said molding and pillars being provided with co-operative recessed and projected portions for maintaining an aligned relation therebetween said recesses and projected portions being in spaced relation to each other and adapted to prevent relative vertical movement between the molding and pillar.

In testimony whereof, I affix my signature.
GEORGE E. GRIMM.